United States Patent [19]

Adams

[11] 3,971,129

[45] July 27, 1976

[54] TOOL FOR STRIPPING INSULATION FROM MULTICONDUCTOR CABLES AND INDIVIDUAL INSULATED CONDUCTORS

[76] Inventor: Francis A. Adams, 88 Manchester Ave., North Haledon, N.J. 07508

[22] Filed: Feb. 24, 1975

[21] Appl. No.: 552,770

[52] U.S. Cl. ................................................ 30/90.1
[51] Int. Cl.² ........................................... H02G 1/12
[58] Field of Search .............. 81/9.5 B, 9.5 R, 9.51, 81/43; 30/90.1, 91.2, 90.4

[56] References Cited
UNITED STATES PATENTS

| | | | |
|---|---|---|---|
| 1,666,277 | 4/1928 | White | 81/9.51 |
| 2,667,094 | 1/1954 | Potter | 81/43 |
| 2,894,424 | 7/1959 | Vaughan | 81/43 |
| 2,901,933 | 9/1959 | Wieser | 30/91.2 |

*Primary Examiner*—Al Lawrence Smith
*Assistant Examiner*—Roscoe V. Parker
*Attorney, Agent, or Firm*—S. H. Hartz

[57] ABSTRACT

A hand tool for stripping insulation from both multiconductor cables and individual insulated conductors comprising a pair of rigid members pivoted to one another at one end and having a guide post with an elongated blade mounted on the opposite end of each member with the cutting edges of the blades in the same plane and opposing one another and spaced from one another to receive the cable or conductor therebetween. A spring urges the members toward one another with sufficient force for the blades to slice the insulation at each side of the cable or conductor when the cable or conductor is inserted transversely between the guide posts at one end of the blades and moved lengthwise of the blades and to slice the insulation circumferentially when the blades are rotated around the cable or conductor. The insulation is then stripped from the cable or conductor by transverse movement of the blades axially of the conductor.

13 Claims, 7 Drawing Figures

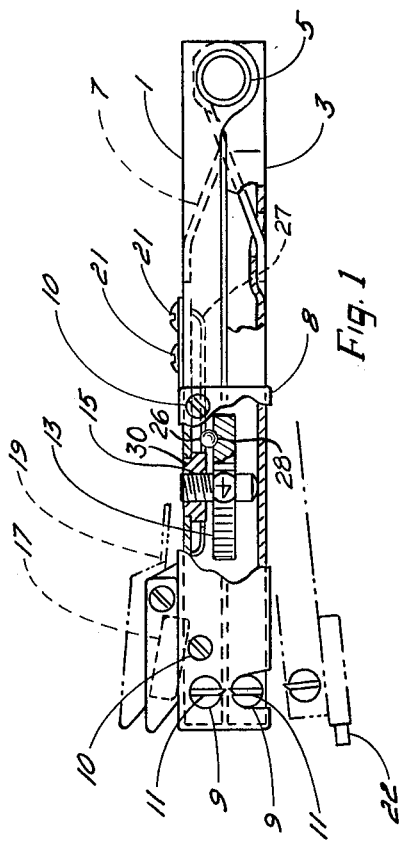
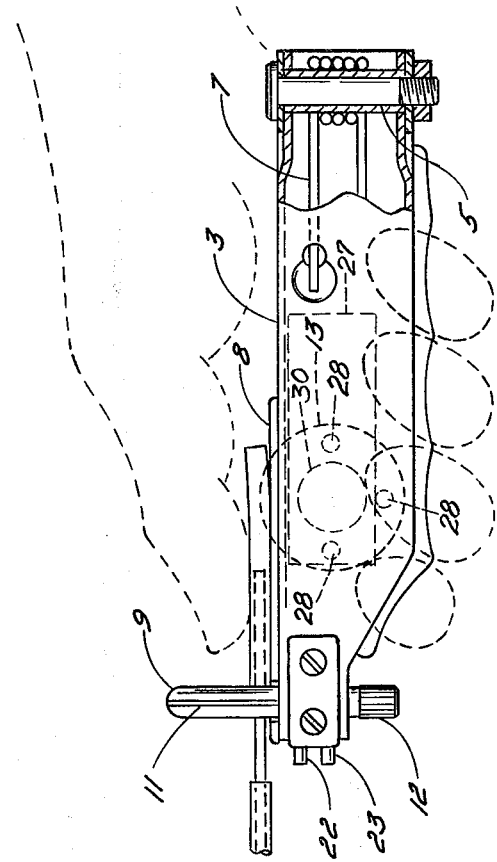
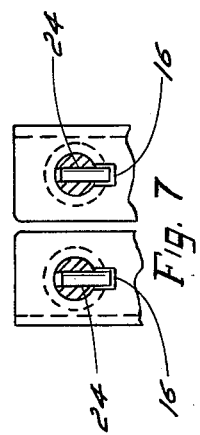
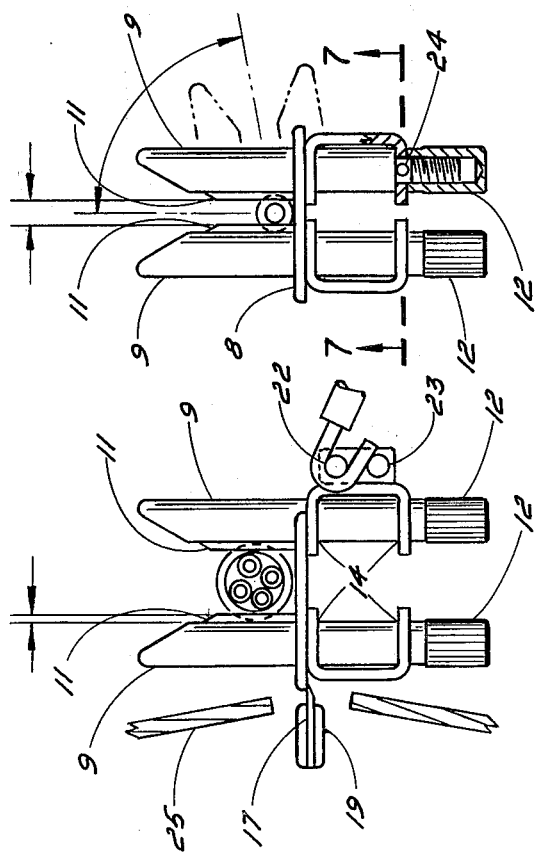
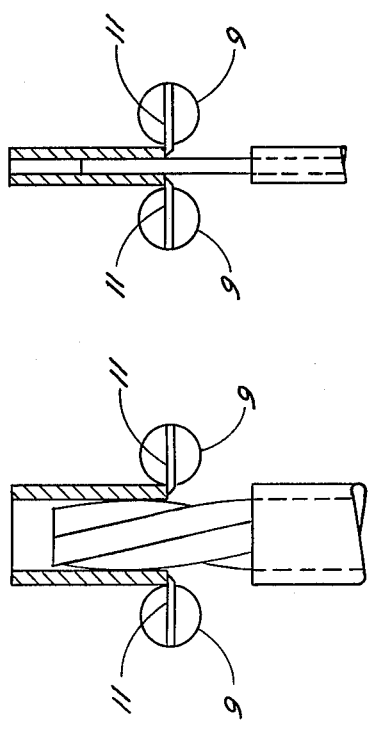
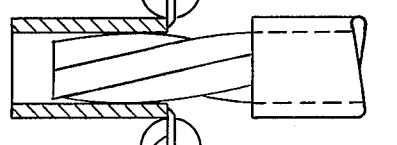

TOOL FOR STRIPPING INSULATION FROM MULTICONDUCTOR CABLES AND INDIVIDUAL INSULATED CONDUCTORS

The invention relates to hand tools for stripping insulation from multiconductor cables and from individual conductors.

PRIOR ART

One device used heretofore for this purpose is shown and described in U.S. Pat. No. 2,901,933 issued Sept. 1, 1959. The device comprises two knife blades mounted on relatively flexible resilient legs, and meeting each other at the cutting edges. Stops are arranged directly behind the blade and engage the insulation on the wire. The blades stand out beyond the stops by the thickness of the insulation and thus prevent the insulation from being cut through entirely and the inner conductor from being damaged. While this feature is desirable, a device of the kind described would be difficult to use. The force for cutting the insulation must be applied by manually pressing the blades together and this would distort the flexible legs so that the blades would be misaligned. The flexible resilient legs on which the blades are mounted cannot be constructed rigid enough to keep the blades aligned while cutting the insulation. Also, only a short length of insulation can be stripped from the conductor because of the limited length of the resilient legs and the position of cams for preventing complete closing of the blades. The tool cannot be used for stripping multiconductor cable and is totally dependent on the thickness of the insulation being consistent.

SUMMARY OF THE INVENTION

The present invention overcomes the problems inherent in the device of the above patent by attaching a pair of elongated blades with their cutting edges in the same plane and opposing one another on parallel guide posts which are secured to rigid arms pivoted at one end and yieldingly urged toward one another by a spring. The blades are secured to the guide posts lengthwise thereof with the cutting edges protruding a distance therefrom to penetrate the insulation of a multiconductor cable to a depth of approximately 85% and an adjustment is provided to limit the minimum distance between the cutting edges of the blades in accordance with the size of the individual conductor being stripped of insulation to avoid scoring the conductor.

The cable or conductor is inserted transversely between the guide posts at the ends of the blades and moved lengthwise of the blades to slice the insulation tangentially at opposite sides of the cable or conductor. The blades are then rotated around the cable or conductor to slice the insulation circumferentially. The insulation is stripped from the cable or conductor by transverse movement of the blades axially of the cable or conductor.

The present tool "slices" the insulation tangentially as the cable or conductor is moved lengthwise of the blades and as the blades are rotated around the conductor in contrast to the "guillotine" type cut used by the tool in the above patent when the blades are pressed together.

The spring force is sufficient to slice the insulation and no manual force is required to press the blades toward one another. Since the arms are rigid the blades never become misaligned and the cutting edges cannot touch one another. The guide posts which support the blades and guide the cable or insulated conductor along the blades, extend laterally and perpendicularly beyond the rigid arms so that insulation of any length may be stripped from a cable or individual conductor without interference from the arms. The tool may be used to remove non-metallic sheathing or insulation from multiconductor cable of either round, flat or oval configuration without damaging the insulation on the individual conductors within the cable and the tool adjusts automatically for different shapes and sizes of cable. Also, the tool can be used for stripping insulation from individual conductors of solid or stranded wire of any size without damaging the wire.

The invention contemplates a tool for stripping insulation from a multiconductor cable or individual conductor comprising a pair of rigid members, a pair of elongated blades each having a cutting edge, means for securing the blades to the rigid members with the cutting edges opposing one another and extending transversely from the same side of each of the members, the blades being arranged to receive the cable or conductor therebetween and to slice the insulation tangentially at opposite sides of the cable or conductor upon inserting the cable or conductor between the blades at one end thereof and moving the cable or conductor transversely between the blades toward the members and to slice the insulation circumferentially upon relative rotation of the tool and cable or conductor, the cutting edges being formed and arranged to engage the severed insulation and strip the severed insulation upon relative transverse movement of the blades and axial movement of the cable or conductor.

The invention also contemplates a method of stripping insulation from a multiconductor cable or individual conductor including the steps of inserting the cable or conductor between the ends of two guide posts provided with elongated blades with their cutting edges in the same plane and opposing one another, moving the cable or conductor transversely between the blades to slice the insulation at each side of the cable or conductor, rotating the blades around the cable or conductor to slice the insulation circumferentially, and moving the blades axially of the cable or conductor to strip the insulation therefrom.

When stripping insulation from a conductor the invention also contemplates the step of first adjusting the distance between the cutting edges of the blades slightly greater than the size of the conductor to avoid damaging the conductor.

When stripping insulation from a multiconductor cable the invention also contemplates the step of first selecting a pair of guide posts with the cutting edges of the blades extending transversely therefrom a distance to slice the insulation to a depth of approximately 85% of its thickness to avoid damaging the insulation on the individual conductors within the cable.

DRAWINGS

FIG. 1 is a top view of a hand tool constructed according to the invention, for stripping insulation from both multiconductor cable and individual conductors, FIG. 2 is a side view thereof, FIG. 3 is a detailed front view showing insulation being stripped from a single conductor, FIG. 4 is a detailed top view of the blade and guide post assembly showing insulation being stripped from a single conductor, FIGS. 5 and 6 are detailed views similar to FIGS. 3 and 4, respectively, showing insulation being stripped from multiconductor cable, FIG. 7 shows a detail of the blade and guide post assembly.

DETAILED DESCRIPTION OF THE DRAWINGS

Referring to the drawing, the novel hand tool shown therein for stripping insulation from multiconductor cable and individual conductors comprises a pair of rigid arms 1 and 3 arranged for pivotal movement about a pin 5. A plate 8 approximately the width of both arms 1 and 3 is secured by screws 10 to arm 1. A guide post 9 with an elongated cutting blade 11 secured thereto and extending lengthwise thereof is attached to the end of each arm remote from pin 5. The guide posts extend laterally and perpendicularly from the arms and are inserted in apertures 14 in arms 1 and 3 and are secured by knurled nuts 12 threaded on the ends of the guide posts. Keys 24 and slots 16 are provided on the posts and arms as shown in FIG. 7 to prevent rotation of the guide posts relative to the arms and maintain the cutting edges of the blades in a common plane and opposing one another. A spring 7 engages arms 1 and 3 and urges the arms towards one another with sufficient force to hold blades 11 in proper proximity to one another when an insulated cable or an insulated individual conductor is inserted transversely between guide posts 9 and moved lengthwise of the blades to a position against plate 8.

When stripping insulation from multiconductor cable, guide posts 9 are moved apart by the cable in opposition to spring 7 to a distance determined by the size and shape of cable being stripped. Blades 11 protrude from posts 9 a distance sufficient only to cut the insulation of multiconductor cable to a depth of approximately 85% of its thickness as shown in FIGS. 5 and 6, thereby precluding the possibility of the blades scoring the insulation on the individual conductors therein.

When stripping insulation from individual conductors, a minimum distance between the cutting edges of blades 11, equal to wire diameter plus 0.005 to 0.010 inch clearance is established by rotating a calibrated wheel 13 protruding through plate 8 and mounted on a screw 15 having one end threaded into a boss 30 on arm 1 and the other end engaging arm 3. Rotation of calibrated wheel 13 adjusts arms 1 and 3 so that the cutting edges of blades 11 are at the desired minimum spacing as shown in FIG. 3 for accommodating individual wire sizes such as 10, 12, and 14 gauge wire. Wheel 13 may be calibrated for the more common wire sizes and a detent 28 is provided for each size to prevent inadvertent loss of adjustment while the tool is being used. A nylon ball 26 is attached to a spring 27 mounted on boss 30 on arm 1 and indexes into detents 28 as wheel 13 is revolved. The surface of each blade remote from the portion of the insulation to be stripped is bevelled to form a cutting edge and the surface of the blade opposite the bevel is flat and engages the insulation to facilitate stripping.

The tool may also be equipped with a blade 17 secured to a leaf spring 19 fastened by screws 21 to arm 1 as shown in FIG. 1 for cutting off the reinforcing paper or plastic strings 25 in multiconductor cable as shown in FIG. 5.

The tool may also be equipped with two posts, 22 and 23, for looping the end of the conductor after the insulation is stripped therefrom as shown in FIG. 5.

OPERATION

The tool is intended for use in removing non-metallic sheathing or insulation from multiconductor cable of either round, flat or oval configuration and for removing insulation from individual conductors of either stranded or solid construction.

When stripping insulation from a single conductor, as shown in FIGS. 2 to 4, calibrated wheel 13 is adjusted to the size of the conductor being stripped. This spaces the cutting edges of the blades a distance equal to the conductor diameter plus 0.005 to 0.010 inch clearance. The insulated conductor is then inserted transversely between guide posts 9 at the outer ends of blades 11 and moved lengthwise of the blades by pressing on the insulated conductor with the thumb until the insulated conductor rests on plate 8 as shown in FIG. 2. This causes the blades to cut the insulation in a slicing manner, transversely, at opposite sides of the conductor.

With slight pressure of the thumb, the insulated conductor is held in position against plate 8 and the tool is rotated about the conductor through an angle of approximately 85°, as shown in FIG. 3, so the blades make a slicing cut circumferentially in the insulation about the conductor. By virtue of the position of the cutting edges of the blades, as shown in FIG. 3, and the foregoing two operations, the insulation is severed about the conductor to within 0.005 to 0.010 inch of the conductor. The small circular section of insulation that remains intact is separated by moving the tool lengthwise of the conductor in the direction of the portion of insulation that is to be removed.

When stripping insulation from a multiconductor cable, as shown in FIGS. 5 and 6, calibrated wheel 13 may be adjusted to the wire size contained within the cable in anticipation of eventually stripping insulation from individual conductors therein. The cable is then pressed between and along posts 9 to a position against plate 8. The cable, being substantially larger than a single insulated conductor, urges guide posts apart in opposition to spring 7 and beyond the position established by calibrated wheel 13. The urging of spring 7 maintains the guide posts in intimate contact with the outer surface of cable insulation and the blades protrude from guide posts sufficiently only to penetrate the cable insulation transversely, in a slicing manner, to approximately 85% of its thickness during cable excursion to plate 8. The tool is then rotated about the cable and moved lengthwise of the cable to remove the insulation in the same manner as described for stripping individual conductors.

A stripping tool constructed according to the invention can be used for stripping insulation from multiconductor cable of any shape without cutting the insulation on the conductors within the cable and the tool adjusts automatically for different shapes and sizes of multiconductor cable. Also, the tool strips insulation from individual conductors, both solid and stranded wire without scoring or damaging the wire, and is manually adjustable to accommodate wires of any size. If a wide range of wire sizes with insulation of different thicknesses are to be stripped, blades of different widths protruding from the guide posts different distances may be used to accommodate the various thicknesses of insulation. The guide post and blade assemblies may be easily removed from the associated arms by removing knurled nuts 12.

The tool is especially handy for stripping insulation from multiconductor cable and insulated wire used in the building trades and presents no possible hazard to the operator. Because the insulation is stripped with the wire parallel to the tool instead of cross-wise of the tool, the forward end of the tool can be presented to wire and cable in very restricted areas, such as inside of wall boxes, control panels and electrical fixtures when conductors to be stripped are short. The tool may also be used in industries using small gauge signal wire such as that used in telephone service. With appropriate blades the tool will remove the sheath from telephone cable carrying as many as fifty No. 24 gauge wires. With the same tool and adjustment it will strip the insulation from the individual No. 24 gauge wire.

In some instances the cable or conductor is described as being moved relative to the tool and in other instances the tool is described as being moved relative to the cable or conductor. It should be understood that either the cable or conductor or the tool may be moved or both may be moved simultaneously without being outside the scope of the invention and the claims are intended to include this definition.

What is claimed is:

1. A tool for stripping insulation from a multiconductor cable or individual conductor comprising a pair of rigid members, a pair of elongated blades each having a cutting edge, means for securing the blades to the rigid members with the cutting edges opposing one another and extending transversely from the same side of each of the members, the blades being arranged to receive the cable or conductor therebetween and to slice the insulation tangentially at opposite sides of the cable or conductor upon inserting the cable or conductor between the blades at one end thereof and moving the cable or conductor transversely between the blades toward the members and to slice the insulation circumferentially upon relative rotation of the tool and cable or conductor, the cutting edges being formed and arranged to engage the severed insulation and strip the severed insulation upon relative transverse movement of the blades and axial movement of the cable or conductor.

2. A tool as described in claim 1 having means for yieldingly urging the members toward one another with sufficient force for the blades to slice the insulation.

3. A tool as described in claim 2 having spring means for yieldingly urging the blades towards one another.

4. A tool as described in claim 1 in which the rigid members include a pair of arms pivotally movable relative to one another, and spring means yieldingly urges the arms toward one another.

5. A tool as described in claim 4 having means for adjusting the minimum distance between the cutting edges of the blades in accordance with the size of the conductor being stripped of insulation prior to insertion of the conductor between the blades.

6. A tool as described in claim 5 in which the adjusting means has detents corresponding to conductors of different diameters.

7. A tool as described in claim 1 in which the cutting edges of the blades are bevelled on one side and the other side of each blade presents a face perpendicular to the cable or conductor to engage the severed insulation and facilitate stripping the insulation from the cable or conductor.

8. A tool as described in claim 4 in which the blade securing means are a pair of guide posts extending transversely from the arms and the cutting edges of the blades extend beyond the posts transversely a distance to slice the insulation to a depth of approximately 85% of its thickness.

9. A tool as described in claim 1 in which the means for securing the blades to the rigid members are a pair of parallel guide posts extending transversely of the members.

10. A tool as described in claim 9 in which the blades are secured to the guide posts with the cutting edges in the same plane.

11. A tool as described in claim 1 having a pair of pins, means for securing the pins to the rigid members with the pins positioned parallel to one another and spaced from one another for receiving a stripped end of a conductor therebetween and forming a loop on the end of the conductor.

12. A tool as described in claim 1 having a knife for cutting a paper strand in the cable, and spring means for fastening the knife to one of the rigid members.

13. A tool as described in claim 1 having a plate secured to one of the members for limiting transverse movement of the cable or conductor between the blades.

* * * * *